Patented June 27, 1944

2,352,416

UNITED STATES PATENT OFFICE 2,352,416

CATALYTIC REFORMING

Charles L. Thomas and Herman S. Bloch, Chicago, Ill., assignors to Universal Oil Products Company, Chicago, Ill., a corporation of Delaware No Drawing. Application February 10, 1941,
Serial No. 378,246

6 Claims. (Cl. 196—52)

This invention relates to a process for increasing the octane number of gasoline fractions. More specifically this invention is related to the reforming of those gasoline fractions which contain substantial quantities of olefins by treatment with specially prepared catalysts as hereinafter described.

The preferred catalysts of our invention are prepared synthetically by definite steps of procedure which are specific in the production of catalysts of high activity and for prolonged use. These catalysts are characterized by their selectivity in accelerating the desired isomerization of olefins and other reactions which result in the increase in octane number of an olefin-containing gasoline. Their exact reproducibility and their refractory nature enable them to retain their catalytic properties over extended periods of time under the high temperatures employed in their use and regeneration.

In one specific embodiment the present invention comprises subjecting an olefin-containing gasoline, such as is produced in the thermal cracking of higher boiling hydrocarbons or in the dehydrogenation of straight run gasoline, to contact at an elevated temperature and at a pressure ranging from atmospheric to moderately superatmospheric with catalytic materials comprising a synthetically prepared calcined composite of hydrated silica and hydrated thoria.

These composites may be prepared by a number of alternative methods which have certain necessary features in common as will be subsequently described. While it is not the purpose of this invention to be limited to any particular proportions of silica and thoria, the most successful catalysts have been those comprising a major proportion of silica and a minor proportion of thoria. While either silica or thoria alone have certain activity in promoting the desired reactions, the composites of the two, particularly with minor proportions of thoria, display results which are more than additive. Owing to the fact that thoria is usually present in minor proportions, it may be convenient to regard it as a promoter with silica being termed the support. In the description of the preparation of the preferred catalysts given below, a hydrated silica gel is composited in various ways with hydrated thoria.

According to one general method of preparation the catalysts may be prepared by precipitating silica from solution as a gel and subsequently admixing or depositing hydrated thoria upon the hydrated silica. One of the more convenient methods of accomplishing this is to acidify an aqueous solution of sodium silicate by the addition of an acid, such as hydrochloric acid. The excess acid and the concentration of the solution in which the precipitation is brought about determine in some measure the suitability of the silica hydrogel for subsequent compositing with hydrated thoria. The hydrated silica is then washed to substantially remove the alkali metal ions. The presence of these alkali metal ions has a harmful effect upon the catalyst, although the mechanism of this deleterious effect is not well understood. It may be due to a sintering or a fluxing of the surface of the catalyst at the elevated temperatures used in the processing and regeneration. The purified hydrated silica may be suspended in a solution of a thorium salt and the hydrated thoria deposited on the hydrated silica by the addition of such basic precipitants as ammonium hydroxide or ammonium carbonate. The hydrated silica may also be mixed in the wet condition with the separately prepared hydrated thoria which must also be free from alkali metal ions.

The alkali metal ion-free catalyst may be prepared in somewhat analogous manner, the wet silica hydrogel previously freed from alkali metal ions being mixed with wet hydrated thoria previously precipitated from a thorium nitrate solution by the addition of ammonium hydroxide.

Another method of preparing the silica-thoria catalyst is to mix a solution of a soluble alkali metal silicate and a soluble thorium salt so as to jointly precipitate hydrated thoria and hydrated silica. A separately precipitated hydrated silica may be added to an aqueous solution of thorium salt and the hydrated thoria precipitated in the presence of the suspended silica by the addition of an alkaline precipitant. If desired, the thoria may be first precipitated in hydrated form and then added to a solution of an alkali metal silicate and the silica precipitated in the presence of the thoria by the addition of just the required amount of acid. In all cases it is essential that the composite be free of alkali metal ions before being subjected to use.

The mixed precipitate may be dried at a temperature of approximately 300° F., powdered and formed into granules which may conveniently be of 6-10 mesh and then calcined at a temperature of approximately 900° F. prior to contacting with the hydrocarbon vapor. By calcining at temperature of the order of 850–1000° F. or somewhat higher, the maximum activity of the catalyst is retained and a further dehydration occurs so that, for example, after a considerable period of heating at 900° F. the water content as determined by analysis is of the order of 2–3%. The catalyst prepared by the various types of procedures hereinbefore set forth possesses a large total contact surface corresponding to a desirable porosity, the pores of the catalyst being of such size and shape that they do not become clogged with carbonaceous deposits after a long period of use and therefore difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous materials at temperatures above 800° F., temperatures as high as 1400–1600° F. having been reached without apparently affecting catalytic activity.

In accordance with the present invention, the catalyst may be conveniently employed in the form of small pellets of granules as filling material in tubes or chambers. A convenient particle size may be one within the approximate range of 1–10 mesh which may apply either to pellets of uniform size, such as short cylindrical shapes, or to particles of irregular size and shape produced by the grinding, consolidating and sizing of the partially dehydrated materials. The simple method of preheating the hydrocarbon vapor to a temperature suitable for the isomerization of the olefins and increasing the octane number of the gasoline fraction and then passing these heated vapors over a stationary mass of catalyst particles in an adiabatic reactor is probably the most satisfactory as there is only a minor thermal change during the conversion process. A small percentage of normally gaseous products is formed in the reforming process.

The temperatures employed in the reforming operation will vary somewhat with particular charging stocks and will be within the range of approximately 400 to approximately 1050° F. When processing any particular charge, shorter contact times are, of course, used with the higher temperatures. Pressures varying from substantially atmospheric to as much as about 90 pounds per square inch, may be used, such pressures being somewhat governed by the velocity of the vapors and the temperatures being employed.

The following two specific examples show the catalytic properties of the catalyst of our invention in isomerizing olefinic hydrocarbons.

Example I

A catalyst having hydrated silica and hydrated thoria in the proportions of 1% $ThO_2$ on $SiO_2$ may be prepared as follows: To a solution of 1140 grams (4 mols) of $Na_2SiO_3.9H_2O$ in 2 liters of water is added 1920 cc. of 5N hydrochloric acid with constant stirring. The precipitate is washed until chloride-free by slurrying 12 times with 1½ liter portions of water. A solution of 22 grams (0.04) mols of $Th(NO_3)_4.4H_2O$ in 250 cc. of water is treated with enough ammonia to make the mixture basic. The precipitate is suspended in 250 cc. of water and the suspension added to a slurry of the silica in 2 liters of water. The mixture is stirred vigorously 1½ hours and filtered. The cake is dried at 300° F., powdered, caked and screened to 10 mesh size and then calcined for several hours at 900° F.

A portion of the catalyst prepared in accordance with the foregoing method was disposed in a tube furnace and maintained at a temperature of 775° F. 98% pure pentene was vaporized, the vapor heated to a temperature of approximately 775° F. and passed through the above mentioned catalyst, being kept at a pressure of approximately atmospheric and with a liquid hourly space velocity of 4. The products from this reaction comprised 9.5% gas, 70.2% of a $C_5$ fraction and 14.5% of higher boiling material. The $C_5$ fraction comprised 77% isopentene corresponding to a 54% yield based on the pentene charged to the process.

Example II

A mixture of 1 and 2 normal octenes was directed through the silica-thoria catalyst at a temperature of 700° F. and substantially atmospheric pressure using a liquid hourly space velocity of 4. A yield of 61.5% by weight of charge of iso-octenes was produced in a single pass, approximately 15.5% of the products being unconverted octenes and approximately 15% being normally gaseous hydrocarbons.

The two examples described above illustrate the olefin-isomerizing ability of the catalyst of my process.

In order to demonstrate the reforming ability of our catalyst, a charging stock of Mid-Continent thermally cracked gasoline of 400° end point, A. P. I. gravity of 47.3 and octane number of 69.7, C. F. R. motor method, was passed through the aforementioned bed of catalyst at a liquid hourly space velocity of 4, a pressure of one atmosphere and at a temperature of 977° F. The octane number of the resulting product was 73.8, C. F. R. motor method, with a liquid recovery of 93.0 volume per cent.

We claim as our invention:

1. A process for increasing the octane number of a gasoline fraction containing a substantial amount of olefins which comprises contacting said gasoline fraction with a catalytic composite substantially free of alkali metal ions and consisting essentially of silica and thoria, and correlating the temperature and time of the contact to effect olefin isomerization as the principal reaction in the process.

2. A process for increasing the octane number of a gasoline fraction containing a substantial amount of olefins which comprises contacting said gasoline fraction with a catalytic composite substantially free of alkali metal ions and consisting essentially of silica and thoria, at a temperature of from about 400° F. to about 1050° F. and a liquid hourly space velocity such as to effect olefin isomerization as the principal reaction in the process.

3. The process as defined in claim 1 further characterized in that said composite is a calcined mixture of a major proportion of precipitated hydrated silica and a minor proportion of precipitated hydrated thoria.

4. The process as defined in claim 2 further characterized in that said composite is a calcined mixture of a major proportion of precipitated hydrated silica and a minor proportion of precipitated hydrated thoria.

5. A process for increasing the octane number of a gasoline fraction containing a substantial amount of olefins which comprises subjecting said gasoline fraction to isomerizing conditions in the presence of a catalyst consisting essentially of silica and thoria.

6. A process for increasing the octane number of a gasoline fraction containing a substantial amount of olefins which comprises subjecting said gasoline fraction to isomerizing conditions in the presence of a catalyst substantially free of alkali metal ions and consisting essentially of a calcined mixture of hydrated silica and hydrated thoria.

CHARLES L. THOMAS.
HERMAN S. BLOCH.